US012437455B2

(12) United States Patent
Mantri et al.

(10) Patent No.: US 12,437,455 B2
(45) Date of Patent: Oct. 7, 2025

(54) ANCHOR BASED CONTENT MANAGEMENT

(71) Applicant: Verizon Patent and Licensing Inc., Basking Ridge, NJ (US)

(72) Inventors: Viraj C Mantri, Mumbai (IN); Srividhya Parthasarathy, Chennai (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 232 days.

(21) Appl. No.: 18/200,051

(22) Filed: May 22, 2023

(65) Prior Publication Data

US 2024/0394941 A1 Nov. 28, 2024

(51) Int. Cl.
| | | |
|---|---|---|
| G06T 11/60 | (2006.01) | |
| G06F 3/01 | (2006.01) | |
| G06F 40/30 | (2020.01) | |
| G06T 7/70 | (2017.01) | |
| G06V 20/20 | (2022.01) | |

(52) U.S. Cl.
CPC ............. *G06T 11/60* (2013.01); *G06F 3/013* (2013.01); *G06F 40/30* (2020.01); *G06T 7/70* (2017.01); *G06V 20/20* (2022.01); *G06T 2200/24* (2013.01); *G06T 2207/20081* (2013.01)

(58) Field of Classification Search
CPC ....... G06T 11/60; G06T 7/70; G06T 2200/24; G06T 2207/20081; G06F 40/30; G06F 3/013; G06V 20/20

USPC ......................................................... 345/156
See application file for complete search history.

(56) References Cited

U.S. PATENT DOCUMENTS

| | | | | |
|---|---|---|---|---|
| 2012/0227000 | A1* | 9/2012 | McCoy | G06F 3/0482 715/762 |
| 2018/0047192 | A1* | 2/2018 | Kristal | G06T 11/60 |
| 2019/0391715 | A1* | 12/2019 | Joyce | G06F 3/0484 |
| 2022/0341743 | A1* | 10/2022 | Bradley | G01C 21/3484 |
| 2023/0214082 | A1* | 7/2023 | Kang | G06F 3/012 345/633 |

FOREIGN PATENT DOCUMENTS

JP 2014186531 A * 10/2014

* cited by examiner

*Primary Examiner* — Mark Edwards

(57) ABSTRACT

One or more computing devices, systems, and/or methods for anchor based content management are provided. A user interface, such as a web page or application, displays content to a user. The user interface is evaluated to generate an anchor layout of cells that are populated with anchors. The user interface is augmented with the anchor layout, which may not be visible to the user. Interaction of the user with the user interface (e.g., eye gaze tracking) is used to detect that the user is interacting with (e.g., looking at) a particular cell. Accordingly, the anchor in the cell is used to display personalized content to the user in place of existing content of the user interface that is located within the cell. The anchor layout, anchors, and personalized content does not modify the original content of the user interface.

20 Claims, 11 Drawing Sheets

FIG. 1A

USER INTERFACE 104/105

- 106: Get $120 off phone with new activation... (108)
- 110: Preorder latest headphones... (112) — 114
- Signup for newsletter to get coupon for... (116)

107

ANCHOR BASED CONTENT MANAGEMENT SYSTEM — 101

100 / 102

ANCHOR BASED CONTENT MANAGEMENT

BACKGROUND

A website provider hosts a website with web pages that can be accessed through browsers or other user interfaces of devices. Often, a web page comprises the same or similar content that is provided to all users of the web page. If the website provider recognizing a device or user requesting the webpage based upon a cookie or user login, then the website may modify the actual web page with content targeted to that user. For example, a news website may provide local news articles for a user. A shopping website may display recently viewed items that were previously viewed by the user.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1A is a diagram illustrating an example of a system for anchor based content management, in accordance with an embodiment of the present technology;

DETAILED DESCRIPTION OF EXAMPLE EMBODIMENTS

Figure 1B:
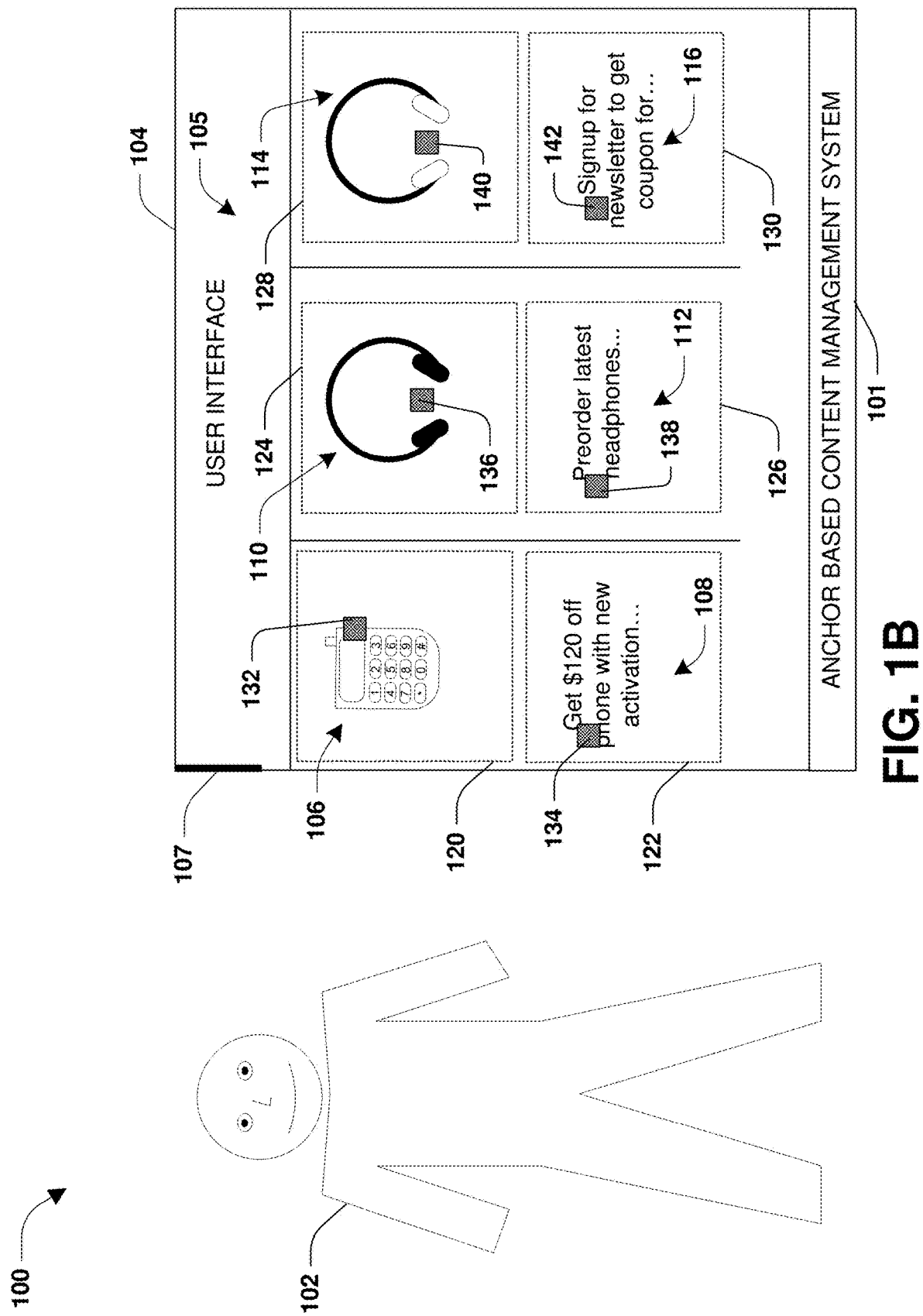
FIG. 1B is a diagram illustrating an example of a system for anchor based content management where a web page is augmented with an anchor layout, in accordance with an embodiment of the present technology.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for anchor based content management are provided. When a device of a user opens a web page through a user interface, the web page is loaded on the device. The web page includes various content items that are displayed through the web page, such as images and descriptions of different products that are available for purchase through the web page. However, the web page may not provide the user with a personalized experience that is dynamically custom tailored in real-time for the user. At best, a web server hosting the web page must recognize the user or information about the user, and then modifies the actual content and/or code of the web page before providing the web page to the device for display to the user.

Accordingly, as provided herein, personalized content is dynamically generated and provided through the web page to the user based upon the user interacting with the web page. When the device receives the web page, the web page is evaluated in order to generate an anchor layout of cells that are populated with anchors (augmented reality anchors). In particular, a document object model tree of the web page is parsed in order to identify a height and width of the web page to display on the device and placement of elements on the display. A clustering algorithm is implemented to understand where and how the elements are clustered on the display. This information is used to generate the anchor layout of cells. In some embodiments, an anchor is a web page element (e.g., HTML code) that is attached to content (personalized content), and is used as a link to that content. In some embodiments, the anchor is a link or tag that directs a user to the content. In some embodiments, an anchor is a position of a web page element containing the content. The content, a position of the content, and an orientation of the content can be changed by accessing and modifying the anchor.

The web page is augmented with the anchor layout such as where each of the cells overlays a particular content item(s) of the web page (e.g., a first cell overlays a first product image; a second cell overlays a second product image, a third cell overlays a first product description; etc.). In some embodiments, the anchor layout is not visible to the user, and thus the web page initially displays the original content of the web page, and content of the web page is not modified.

A camera may be used for eye gaze tracking to detect whether the user is looking at a content item of the web page, which is overlaid by a particular cell of the anchor layout (e.g., the user is looking at the first product image overlaid by the first cell). Other user input tracking mechanisms (e.g., tracking input through a touch screen, mouse, keyboard, etc.) may be used to detect that the user focusing on the content item (e.g., clicking or hovering over the first product image).

In response to a determination that the user is looking at the content item such as the first product image, features of the content item (and/or other content items within the first cell) are evaluated to generate personalized content for the user. Various functionality may be used to generate the personalized content, such as a demographic based recommender engine, a sentiment analyzer, an entity analyzer, object and product recognition, and text recognition. The personalized content may be custom tailored to interests of the user. For example, the first product image may depict a watch. However, the user may be identified as a user that has recently began posting about running, and thus the personalized content may relate to a running watch. In another example, the first product image may describe a generic 10% discount for the original watch. The personalized content may describe a 15% discount for the same watch, which is predicted to be a large enough discount to entice the user to purchase the original watch (e.g., previous purchases, coupon/discount usage, income, job title, and/or other information may be used to create the prediction). In this way, the anchor in the first cell overlaying the first product image is used to display the personalized content (e.g., specific watch or special discount, etc.) to the user. The personalized content is displayed without modifying the original content and/or code of the web page, such as where the personalized content is displayed over the first product image so that the first product image is not visible to the user.

This innovation relates to an anchor based content management system that uses augmented reality to dynamically personalize the content of a web page for a user in real-time at run-time on a device. The particular content that the user sees through the web page is dynamically modified based upon specific preferences of the user. The content is personalized, for example, for the user by utilizing user biometrics such as eye gaze tracking to influence what content to dynamically show to the user in real-time while the user is presented with the web page. That is, while the user is looking around the web page, personalized content is generated and displayed to the user based upon what content the user is currently looking at on the web page. In this way, the content of the web page is dynamic in nature based upon biometrics of the user.

When the user opens the web page (e.g., an e-commerce website), the web page is loaded on the device, which may be similar for different users across different devices. In some embodiments, the anchor based content management system is deployed on the device such as an augmented reality enabled device with web browsing capabilities (e.g., a mobile device with a camera, a tablet, a kiosk, a laptop, etc.). The anchor based content management system may start tracking eye biometrics in order to understand interests of the user, such as products of interest or specific variants of products sought by the user. These interests are identified based upon whether the user is gazing at certain products or variants of products depicted by the web page.

The anchor based content management system utilizes augmented reality anchors in a grid or mesh layout to dynamically alter what content is displayed to the user through the web page based upon the interests of the user tracked in-real time as the user views the web page. In some embodiments, a number of augmented reality anchor invocations are directly proportional to the display resolution of the web page. The augmented reality anchors intercept biometrics (e.g., eye gaze detections) and other inputs such as mouse clicks, joystick inputs, touch screen inputs, etc. The augmented reality anchors interconnect personalized content (e.g., images, videos, text, hyperlinks, product assets, etc.) from a user interface layout flow of the web page (e.g., a digital sales purchase workflow, a connected home workflow) with respect to external user biometrics and/or other inputs. The augmented reality anchors augment the original content of the web page with personalized content, which may also include requisite results or next best actions for the user to take such as to complete a purchase or redeem a coupon.

The augmented reality anchors are used to display (or augment existing) content such as text, images, videos, and/or other types of personalized content that may be highly relevant to the user. The augmented reality anchors are used to display (or augment existing) product comparison interfaces and/or pricing comparison interfaces. The augmented reality anchors are used to display (or augment existing) help and troubleshooting interfaces. The personalized content is dynamically selected, generated, and/or displayed without altering element in the web page from a backend perspective (e.g., a website hosting server does not modify code or web page elements of the web page before the web page is provided to a device for display). In this way, the augmented reality anchors operate as a centralized controller (e.g., hosted at a user device) that can interact across user personalization journeys (e.g., interests of a user viewing a first web page can be used to display personalized content when the user subsequently views a second web page).

The augmented reality anchors are capable of storing details (e.g., a data storage mechanism being triggered and utilized based upon user biometrics) that can be presented to users through a user interface displaying the web page without making changes to the web page. In particular, the personalized content is displayed such that the personalized content hides the generic/original content of the web page from the user without actually modifying such content. Displaying personalized content through augmented reality anchors is much less costly than dynamically changing the user interface of the web page. Otherwise, a backend web hosting server would have to modify the code and/or elements of the web page before providing the web page to the device. The augmented reality anchors can be used to modify the user interface in order to make the user interface more visually appealing to users. The augmented reality anchors can be presented on any given pixel (accurately) in a given space (e.g., anywhere within a cell), which can allow a user to "peek" into minute/granular details of the web page. The augmented reality anchors are used to perform augmentation on top of a 2D web page/user interface/screen that the user is viewing such that the actual scene is the web page itself on which the anchor grid and augmented reality anchors are augmented. The web page data itself is not changed, but the personalized content may be displayed over original content/data, thus augmenting the web page.

FIGS. 1A-1D are diagrams illustrating an example of a system 100 for anchor based content management. A user 102 may be interacting with a device 104 that is displaying a user interface 105. In some embodiments, the device 104 is a mobile device, a wearable device, a phone, a kiosk, a laptop, a smart display, or any other type of electronic device. The device 104 may have a camera 107 that can be used to obtain imagery (e.g., a live stream of frames) of the user 102 and a surrounding environment. The user interface 105 displays a web page that includes various original content items, such as a first product image 106 of a phone, a first product description 108 for the phone, a second product image 110 for a first pair of headphones, a second product description 112 for the first pair of headphones, a third product image 114 for a second pair of headphones, and a third product description 116 for the second pair of headphones, as illustrated by FIG. 1A.

An anchor based content management system 101 hosted by the device 104 evaluates the web page in order to generate an anchor layout of cells that are populated with anchors. The anchor layout comprises a first cell 120 overlaying/encompassing the first product image 106, a second cell 122 overlaying/encompassing the first product description 108, a third cell 124 overlaying/encompassing the second product image 110, a fourth cell 126 overlaying/encompassing the second product description 112, a fifth cell 128 overlaying/encompassing the third product image 114, and a sixth cell 130 overlaying/encompassing the third product description 116, as illustrated by FIG. 1B. It may be appreciated that a cell may overlay/encompass a single element of the web page or multiple elements of the web page. Anchors are populated within each of the cells at particular pixels such as (x, y) coordinates of the cells. In some embodiments, an anchor is placed at a pixel within a cell that is part of an original content item of the web page, or is placed at a pixel within the cell that is not part of the original content item.

A first anchor 132 is placed at a pixel that is part of the first product image 106 that is encompassed by the first cell 120. A second anchor 134 is placed at a pixel that is part of the first product description 108 that is encompassed by the second cell 122. A third anchor 136 is placed at a pixel that is part of the second product image 110 that is encompassed by the third cell 124. A fourth anchor 138 is placed at a pixel that is part of the second product description 112 that is encompassed by the fourth cell 126. A fifth anchor 140 is placed at a pixel that is part of the third product image 114 that is encompassed by the fifth cell 128. A sixth anchor 142 is placed at a pixel that is part of the third product description 116 that is encompassed by the sixth cell 130. In some embodiments, the anchor layout, the cells, and/or the anchors are not visible to the user 102.

Figure 1C:
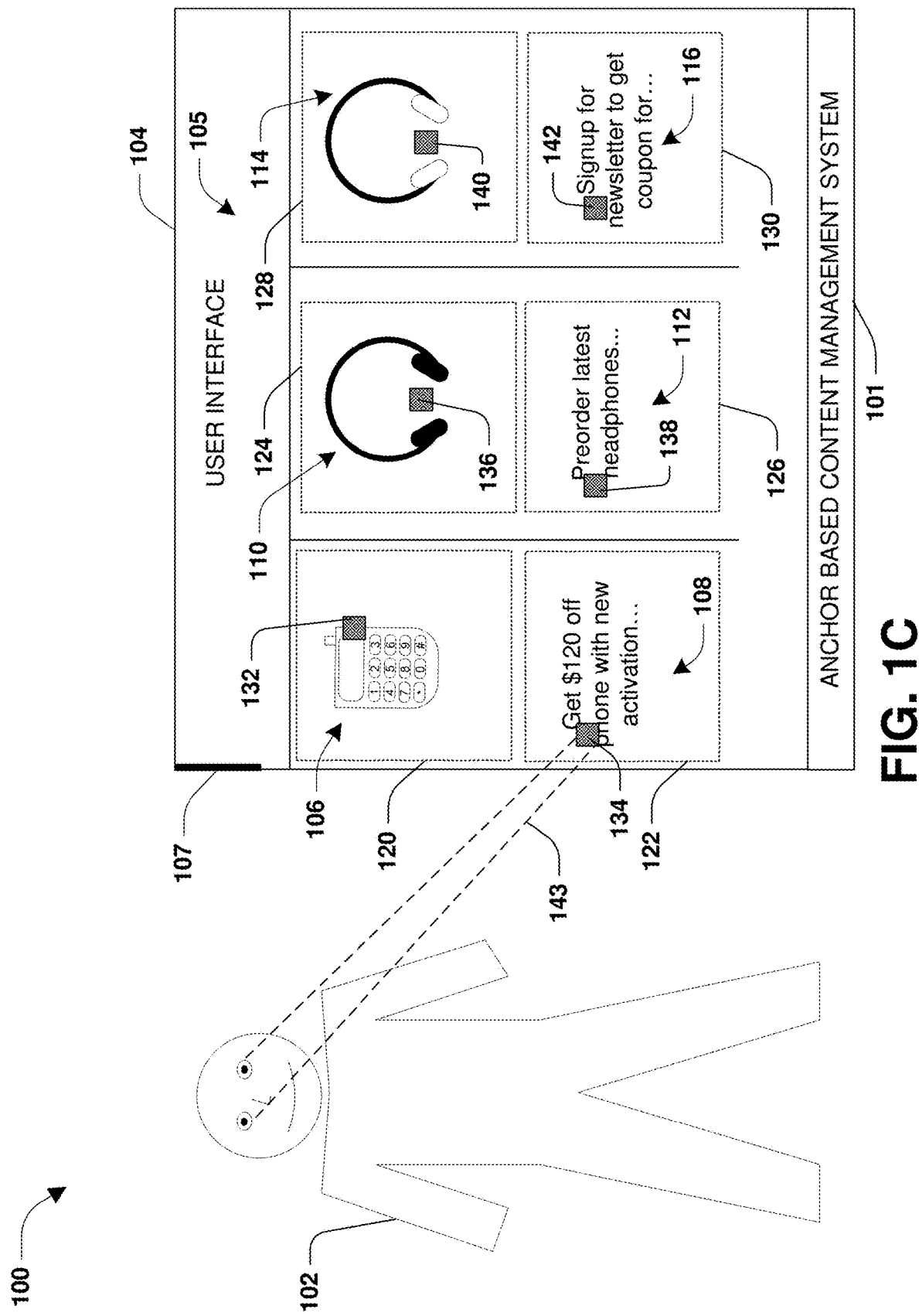
FIG. 1C is a diagram illustrating an example of a system for anchor based content management, in accordance with an embodiment of the present technology.
Figure 1D:
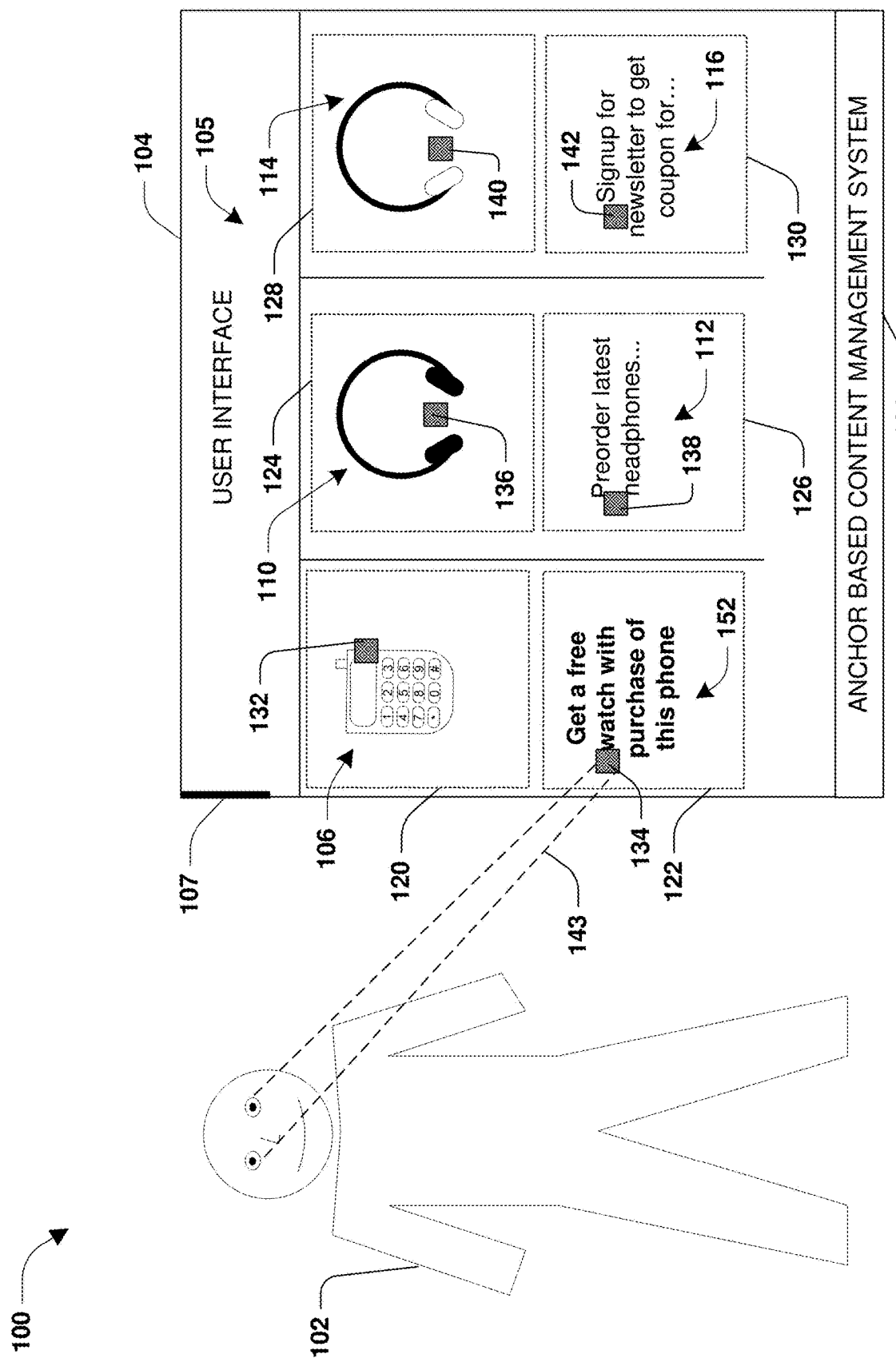
FIG. 1D is a diagram illustrating an example of a system for anchor based content management where personalized content is displayed through an anchor, in accordance with an embodiment of the present technology.

The camera 107 is controlled by the anchor based content management system 101 to capture imagery (e.g., a live feed of frames) of the user 102 looking 143 at the web page displayed through the user interface 105 of the device 104, as illustrated by FIG. 1C. Image processing may be performed upon the imagery to determine that the user 102 is gazing at the second cell 122. In response to determining that the user 102 is gazing at the second cell 122, features of the first product description 108 within the second cell 122 and/or features of other content items within the second cell 122 are identified and used to generate personalized content 152 for the user 102, as illustrated by FIG. 1D.

A variety of other information may be used to generate the personalized content 152 such as a browsing history of the user, a purchase history of the user, demographics of the user, an income of the user, a career of the user, previous content viewed by the user while accessing other web pages and tracked by the anchor based content management system 101 using biometrics of the user such as gaze detection, features of other content items of the web page, demographic information, a sentiment of the user detected from facial expressions and speech of the user, etc. This information may be used to predict an interest of the user, which is used to select or create the personalized content 152. For example, the user may have been previously browsing watches and creating social network posts about watches. Accordingly, the user may be more inclined to purchase the phone depicted by the first product image 106 when offered a watch for free with the purchase of the phone (e.g., the personalized content 152 offers the watch for free) compared to a discount on the phone (e.g., the first product description 108 offers the $120 discount). The personalized content 152 is populated within the second cell 122 over the first product description 108 so that the user does not see the first product description 108, and instead sees the personalized content 152.

Figure 2:
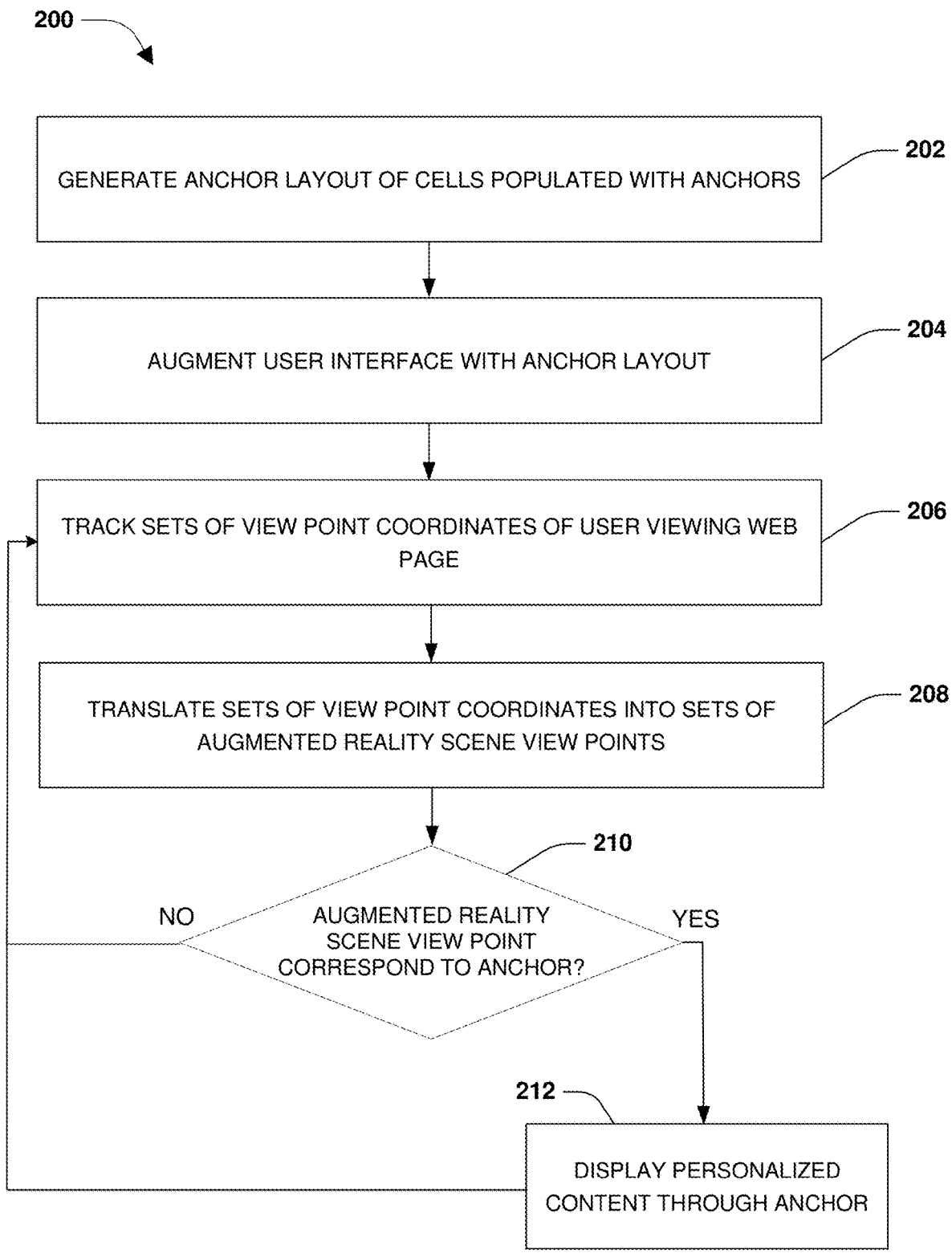
FIG. 2 is a flow chart illustrating an example method for anchor based content management, in accordance with an embodiment of the present technology.

FIG. 2 is a flow chart illustrating an example method 200 for anchor based content management. A user may utilize a device to access a user interface that displays content, such as a web browser or application that displays a web page or application data. When the device receives the user interface (e.g., receives a document object model and web page content of the web page to display), the user interface is evaluated in order to generate an anchor layout of cells that are populated with anchors, during operation 202 of method 200. A number of cells for the anchor layout is calculated based upon a height and width of the user interface. In some embodiments, a number of anchor invocations for the anchors (e.g., a clickable or active region for an anchor) are defined as being directly proportional to a screen resolution of the user interface being displayed.

During operation 204 of method 200, the user interface such as the web page is augmented with the anchor layout so that the cells of the anchor layout overlay content items of the user interface. In some embodiments, the anchor layout, the cells, and the anchors are transparent and not visible to the user viewing the user interface. In some embodiments, overlaying the user interface with the anchor layout, the cells, and the anchors does not modify original content of the user interface (e.g., document object model information, code, scripts, and web page elements of the web page remain in an unmodified state).

During operation 206 of method 200, sets of view point coordinates of the user viewing the user interface (or sets of coordinates tracked from user input of the user interacting with the user interface with a peripheral or touch screen such as a hover gesture, mouse hover, etc.) is tracked based upon imagery captured from a camera (e.g., a live stream of frames). In some embodiments, a set of viewpoint coordinates relate to coordinates of where the user is gazing at a point in time. In this way, the sets of view point coordinates correspond to gaze-tracking of the user. In some embodiments, the anchors intercept biometric gaze detections as the sets of view point coordinates that are used to identify the sets of view point coordinates.

During operation 208 of method 200, the sets of view point coordinates are translated into sets of augmented reality scene view points. A set of augmented reality scene view points pertain to coordinates that may lie within the anchor layout such as within a particular cell of the anchor layout within which an anchor is located.

During operation 210 of method 200, a determination is made as to whether a set of augmented reality scene view points correspond to an anchor. The set of augmented reality scene view points correspond to the anchor if the set of augmented reality scene view points correspond to a coordinate within a cell within which the anchor is located. If there are no augmented reality scene view points that correspond to any of the anchors, then the sets of view point coordinates are further tracked. If a set of augmented reality scene view points correspond to an anchor, then personalized content is generated and displayed through the anchor, during operation 212 of method 200. The sets of view point coordinates continue to be tracked to see if the user transitions to viewing/gazing at a different cell/anchor, and thus different personalized content is provided through the different cell/anchor.

In some embodiments of generating and displaying the personalized content, the set of augmented reality scene view points are used to determine that the user is viewing a cell within which an anchor is populated. The cell is overlaying a content item of the user interface (e.g., a description of a desk available for purchase), which is determined to be of interest to the user because the user is viewing/gazing at the content item. Features of the content item are identified and evaluated in order to generate the personalized content for the user. In some embodiments, the features may correspond to entities, objects, products, and/or text associated with the content item. For example, the features may correspond to a price of the desk and a metal material of the desk. Information about the user may be used to determine that the user would be interested in a higher cost wood desk (e.g., browsing history and purchase history may indicate that the user has an interest in higher end wood office furniture). Accordingly, the personalized content may correspond to a description of a higher end wood desk that may be more interesting to the user than the cheaper metal desk.

In some embodiments, the personalized content may correspond to alternate text that is different than text of the content item, an image that is different than an existing image of the content item, etc. The personalized content may be text, an image, video, a product compare interface, a help interface, a troubleshooting interface, a purchase interface, or other content that may be selected or generated using a machine learning framework. The machine learning framework uses information about the user (e.g., purchase history, browsing history, job title, neighborhood information, demographics, gender, information within emails, information within text messages, social network posts, user profile information, etc.) and/or features of the content item in order to determine a user interest of the user in a product, service, entity (e.g., a person such as a celebrity), an object, an activity (e.g., biking), or a variant of such. In this way, the personalized content is created based upon the product, service, entity, object, or variant of such.

In some embodiments of generating and displaying the personalized content, text and context information may be extracted from the content item. The text and context information is used to detect a product depicted or described by the content item. A sentiment associated with viewing the content item is determined (e.g., the user is smiling while looking at the content item; the user is frowning while looking at the content item; etc.). The personalized content is generated based upon the sentiment and the product.

In some embodiments of generating and displaying the personalized content, a demographic based recommendation engine, a sentiment analyzer, and/or a context analyzer may be used to generate a prediction based upon information related to the user and the content item (e.g., a prediction that the user would prefer the wood desk and not the metal desk). In this way, the personalized content may be generated based upon the prediction.

Once the personalized content is selected from existing available content or is generated as new content, the personalized content is displayed through the anchor in the cell within which the set of augmented scene view points are located. In some embodiments, the personalized content is displayed according to a location and size that visually occludes the content item so that the content item is not visible (e.g., the user sees the wood desk and not the original metal desk). In some embodiments, the personalized content is displayed without modifying the web page (e.g., the description of the metal desk remains intact as part of the web page, but the personalized content is displayed over the description of the metal desk). In some embodiments, the anchor interconnects a product asset of the content item with a workflow that is executed as part of the personalized content such as a purchase workflow where the user can purchase the wood desk. In some embodiments, the anchor is enabled for user interaction. In response to the user interacting with the personalized content, execution of functionality is triggered based upon the anchor being enabled for the user interaction (e.g., a purchase interface may be hosted so that the user can purchase the wood desk). The functionality may relate to purchase functionality, email functionality to email information about the personalized content, social network posting functionality to post about the personalized content, sharing functionality to share information about the personalized content, troubleshooting functionality to troubleshoot a product described by the personalized content, etc.

Gaze tracking for the user may continue to be performed while the personalized content is displayed. A determination may be made that the user is now viewing a different cell of the anchor layout. Accordingly, personalized content may be created based upon information about the user and a content item(s) within the different cell, and the personalized content is displayed within the different cell. In this way, different personalized content is dynamically generated/selected and displayed through the anchors of the anchor layout in real-time as the user is viewing the user interface.

Because the personalized content is tailored for the user and is based upon information about the user, different personalized content may be displayed to different users when viewing the same cell overlaid with the content item of the web page. In this way, the anchor layout is used to display personalized content that is tailored to the particular user that is currently viewing the user interface or web page.

Figure 3:
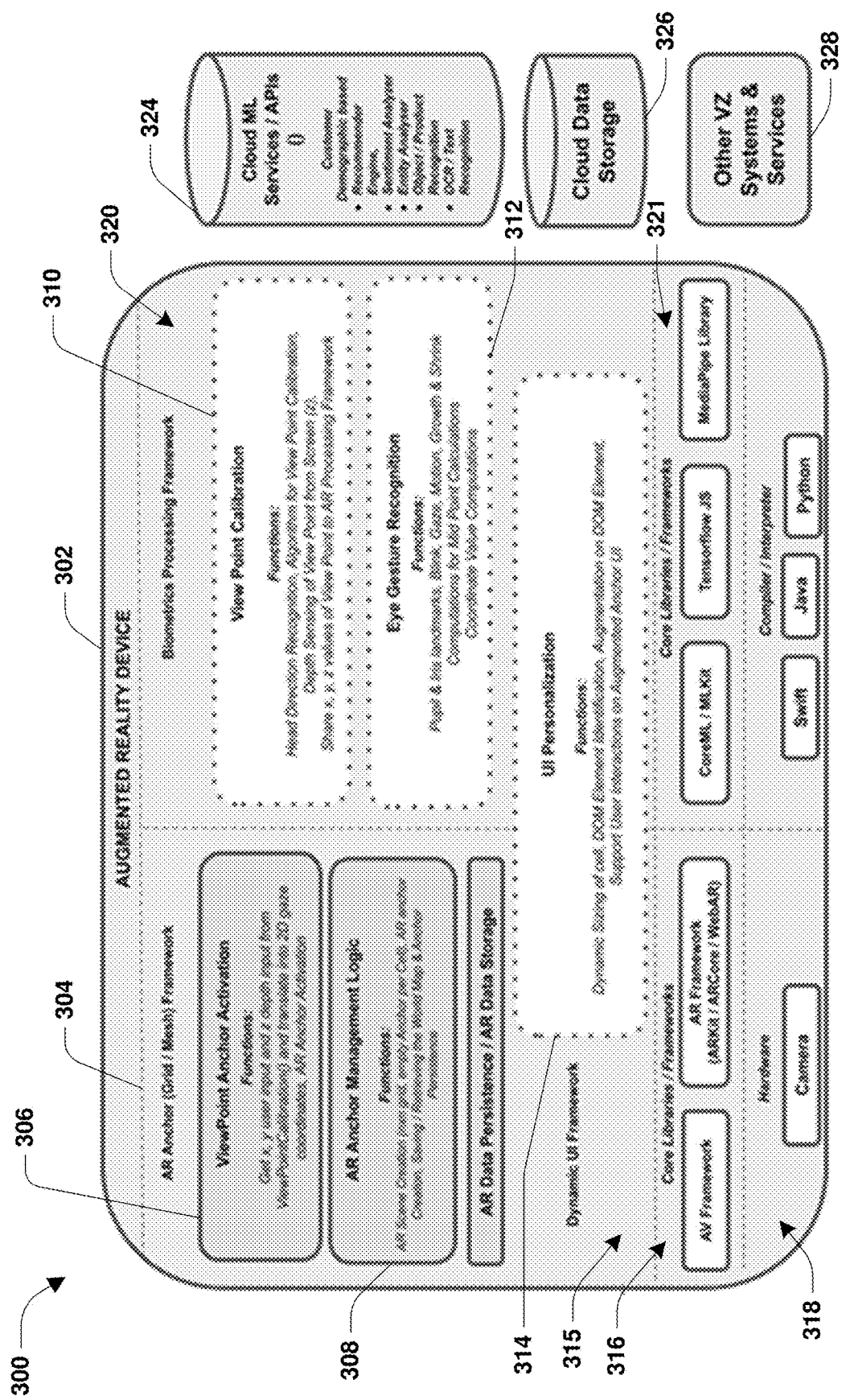
FIG. 3 is a diagram illustrating an example of a system for anchor based content management, in accordance with an embodiment of the present technology.

FIG. 3 is a diagram illustrating an example of a system 300 for anchor based content management. It may be appreciated that anchor based content management may be implemented by a wide variety of computing environment systems (e.g., a mobile computing system, a smart device, a tablet, a kiosk, etc.), and that system 300 is merely one embodiment of implementing anchor based content management. A device 302 (e.g., an augmented reality device that has a camera 318 for capturing imagery of a user) may implement an anchor based content management system that includes multiple frameworks used to implement anchor based content management for content displayed to a user of the device 302. In particular, the device 302 includes an augmented reality anchor framework 304 that handles augmented reality functions such as creating, saving, and/or retrieving an augment reality scene and augmented reality world map, along with creating and managing anchors (augmented reality anchors). The augmented reality anchor framework 304 includes core libraries and frameworks 316 that perform such augmented reality functions. The augmented reality anchor framework 304 includes view point anchor activation functions 306 that obtain x, y user input and z depth input from a view point calibration function, and translates the input into 2D gaze coordinates used to detect anchor activation. The augmented reality anchor framework 304 includes augmented reality anchor management logic 308 that creates augmented reality scenes (e.g., create an n×n grid (anchor layout) with an empty anchor per cell), anchor creation, saving/retrieving a world map, and performing anchor persistence using data storage.

The device 302 includes a dynamic user interface framework 315 that provides user interface personalization and functions 314. The dynamic user interface framework 315 includes core libraries and frameworks that handle user interface functions on the web and/or on mobile devices. The dynamic user interface framework 315 is configured to understand the document object model based structure of web pages and applications. The dynamic user interface framework 315 partitions a web page according to a size of the web page. The dynamic user interface framework 315 dynamically sizes a virtual grid (anchor layout) in order to cluster document object model objects into different cells of the virtual grid, and supports user interactions on an augmented anchor user interface (e.g., user interactions with anchors within cells of an anchor layout).

The device 302 includes a biometrics processing framework 320 that includes core libraries and frameworks 321. The biometrics processing framework 320 receives live camera feed imagery from the camera 318 as input for evaluation in order to determine a view point of the user with respect to a screen of the device 302. The biometrics processing framework 320 uses machine learning and computer vision to track the iris of the user in order to calibrate coordinates of the screen being viewed by the user. The biometrics processing framework 320 implements view point calibration 310 that performs functions such as head direction recognition, view point calibration, depth sensing of a view point from the screen (z depth), and provides x, y, z values of a view point to an augmented reality processing framework. The biometrics processing framework 320 implements eye gesture recognition 312 that performs pupil and iris landmarking, blink detection, gaze detection, motion detection, growth and shrink computations for mid-point calculations and coordinate value computations.

The device 302 utilizes external systems and databases such as cloud machine learning services 324, cloud data storage 326, and/or other systems and services 328 (e.g., cellular provide systems and services). The cloud machine learning services 324 provide various functionality based upon information about the user (e.g., user demographics), such as a recommender engine, a sentiment analyzer, an entity analyzer, object and product recommendation, text recognition, and/or other functionality used to generate recommendations of personalized content to show to the user.

Figure 4:
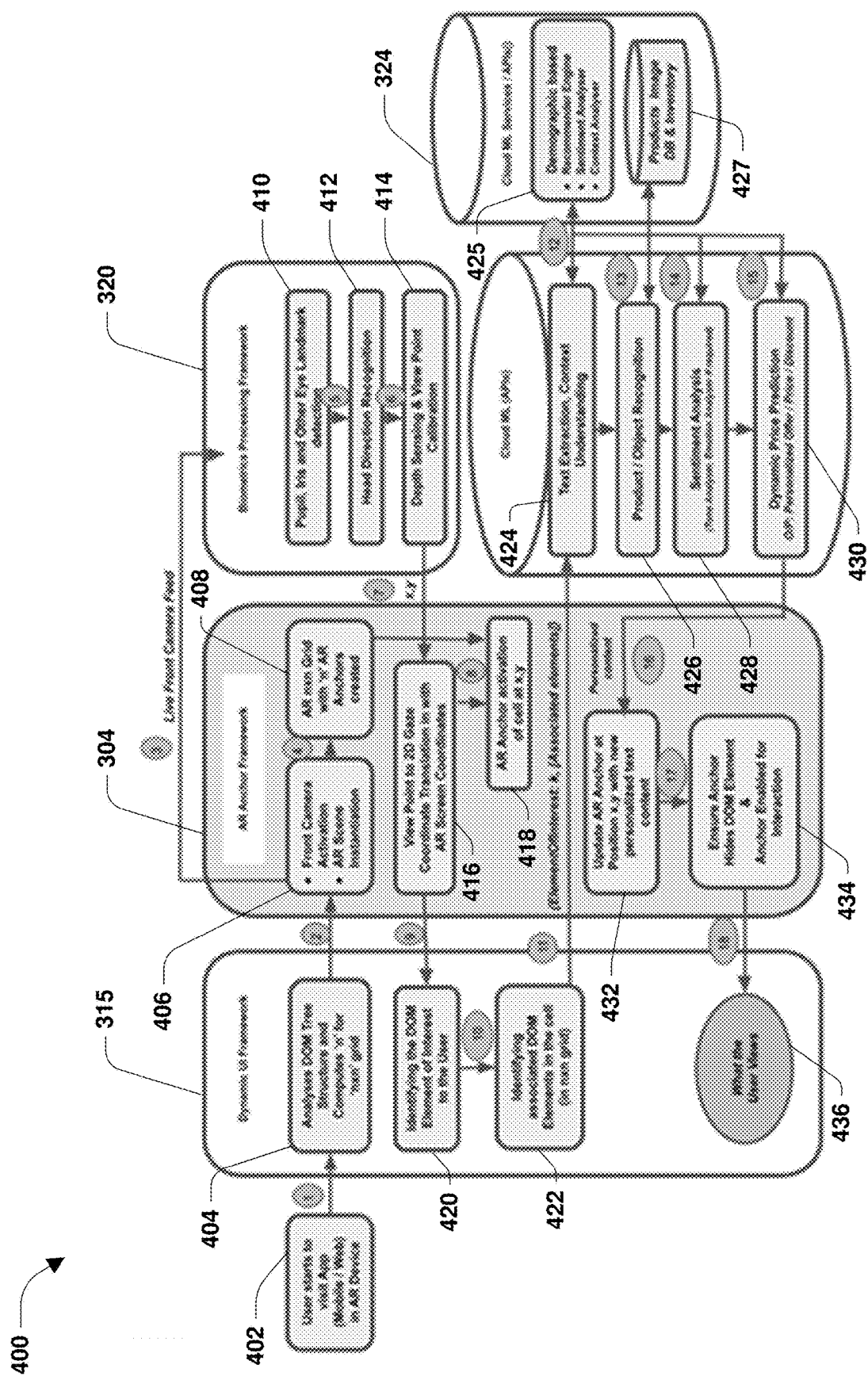
FIG. 4 is a diagram illustrating an example of a system for anchor based content management utilizing a dynamic user interface framework, an augmented reality anchor framework, and a biometrics processing framework, in accordance with an embodiment of the present technology.

FIG. 4 is a diagram illustrating an example of a system 400 for anchor based content management utilizing the dynamic user interface framework 315, the augmented reality anchor framework 304, the biometrics processing framework 320, and the cloud machine learning services 324 previously described in relation to FIG. 3. During operation 402, a user utilizes a device (e.g., device 302 of FIG. 3) to access a user interface. Accordingly, the dynamic user interface framework 315 analyzes a document object model tree structure of a web page for display through the user interface in order to compute "n" for an n×n grid, during operation 404. The dynamic user interface framework 315 computes "n" based upon a height/width of a display of the user interface and based upon placement of elements on the display (e.g., content items of the web page). In some embodiments, a clustering algorithm is used to understand where and how the elements (content items) are clustered on the screen. The value "n" can be defined with <div> and <frame> tags that are used to understand the structure of the web page from the document object model tree. The tags help to understand if the elements (content items) are already in a row-column format (grid), and thus an anchor layout with a similar row-column format can be created with anchors in each cell. If there is no existing grid structure that can be identified from the document object model, then a height and width of the web page and screen is considered in order to identify "n" where each cell will accommodate a least number of elements (content items).

In some embodiments, the document object data may be organized/structured such that a dictionary consisting of cells and an array of document object model elements in the cells is created by the dynamic user interface framework 315. For example, the dictionary may be: {Cell01: [domElementA, domElementB, . . . , domElementJ], Cell02: [domElementK, domElementL, . . . , domElementP], Cell0N: [domElementQ, domElementR, . . . , domElementT], . . . . CellNN: [domElementU, domElementV, . . . , domElementZ]}.

During operation 406, the augmented reality anchor framework 304 activates a camera of the device and instantiates an augmented reality scene. During operation 408, the augmented reality anchor framework 304 creates the n×n grid with 'n' anchors created within cells of the n×n grid (an anchor layout with grids within which anchors are populated).

During operation 410, the biometrics processing framework 320 performs pupil, iris, and other eye landmark detection. During operation 412, the biometrics processing framework 320 performs head direction recognition. During operation 414, the biometrics processing framework 320 performs depth sensing and view point calibration, and provides x, y coordinates (sets of view point coordinates) to the augmented reality anchor framework 304.

During operation 416, the augmented reality anchor framework 304 translates the sets of view point coordinates into sets of augmented reality scene view points (e.g., performs 2D gaze coordinate translation). During operation 418, the augmented reality anchor framework 304 activates an anchor within a cell corresponding to a set of augmented reality scene view points (e.g., a cell at x, y). Additionally, the dynamic user interface framework 315 identifies a document object model element (e.g., a content item of the web page) that is of interest to the user based upon the sets of augmented reality scene view points, during operation 420. During operation 422, the dynamic user interface framework 315 identities associated document object model elements (content items) in the cell in the n×n grid (anchor layout).

During operation 424, a set of cloud machine learning application programming interfaces (APIs) perform text extraction and context understanding upon the document object model elements (content items) within the cell. Operation 424 may utilize demographic based recommender engines (e.g., recommend types of products or services that may be of interest to users having similar demographics as the user), sentiment analyzers (e.g., identify a sentiment of the user from facial expressions), and/or context analyzers (e.g., identify a context of the user viewing a content item such as an intent to purchase a desk) of the cloud machine learning services 324, during operation 425. During operation 426, the set of cloud machine learning APIs perform product and object recognition (e.g., identification of products and objects depicted or described by the content items), which may utilize a products image database and inventory 427. During operation 428, the set of cloud machine learning APIs perform sentiment analysis, which may utilize a tone analyzer and/or emotion analyzer based upon facial expressions and/or speech of the user detected by the device. During operation 430, the set of cloud machine learning APIs perform dynamic price prediction if a product is to be provided as personalized content, which may involve the prediction and creation of a personalized offer, price, and/or discount for the particular user.

During operation 432, the anchor at the position x, y within the cell is updated with the personalized content. During operation 434, the personalized content hides the content item (document object model element) within the cell that is to be replaced with the personalized content. The anchor is enabled for user interaction so that the user may interact with the personalized content (e.g., click a hyperlink, interact with a purchase user interface, etc.). During operation 436, the web page with the personalized content is provided to the user.

Figure 5:
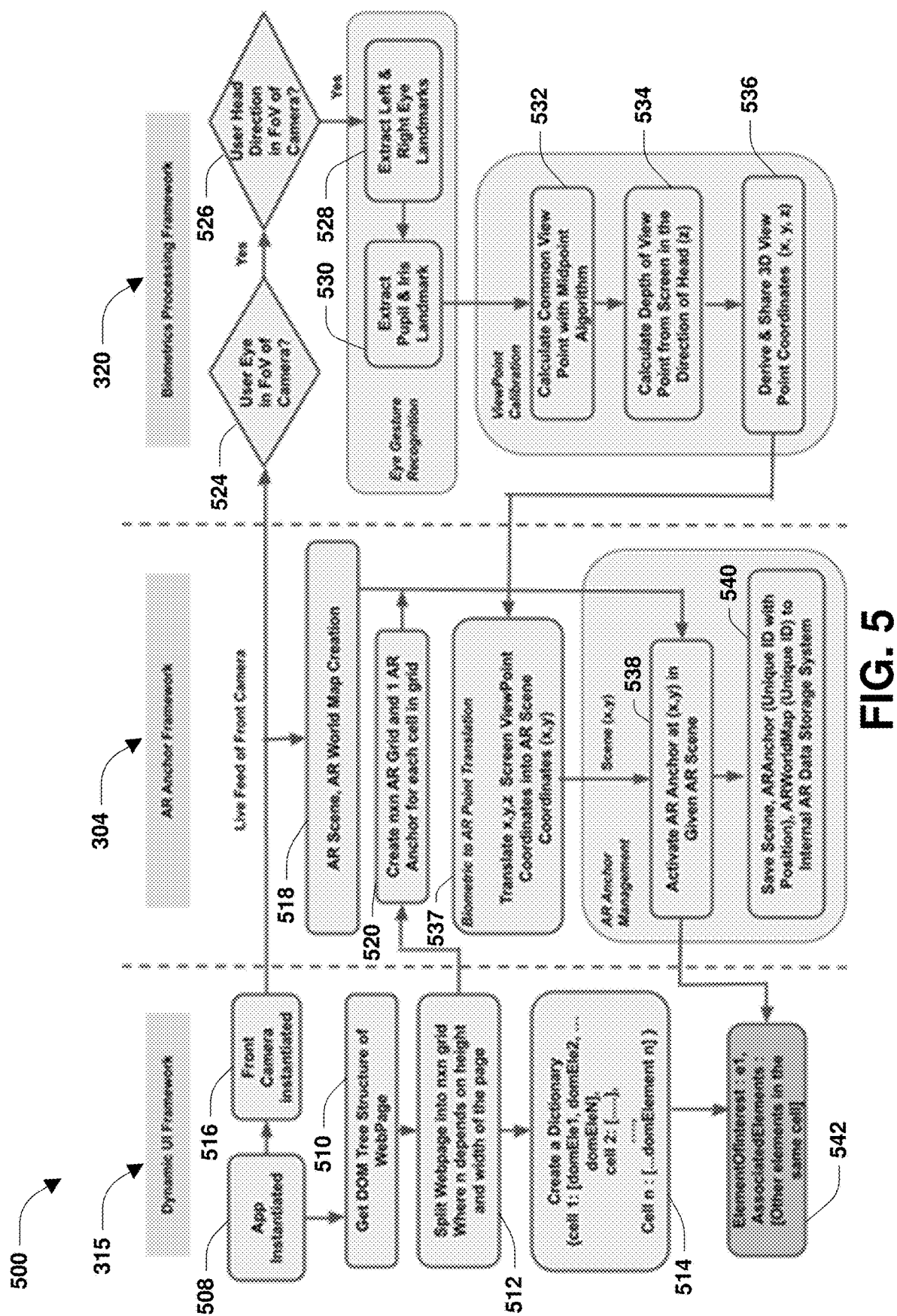
FIG. 5 is a diagram illustrating an example of a system for anchor based content management utilizing a dynamic user interface framework, an augmented reality anchor framework, and a biometrics processing framework, in accordance with an embodiment of the present technology.

FIG. 5 is a diagram illustrating an example of a system 500 for anchor based content management utilizing the dynamic user interface framework 315, the augmented reality anchor framework 304, and the biometrics processing framework 320, previously described in relation to FIGS. 3 and 4. During operation 508, the dynamic user interface framework 315 detects that an application has been instantiated. In some embodiments, the application is accessing a web page for display through a user interface. During operation 510, the dynamic user interface framework 315 obtains a document object model tree structure of the web page. During operation 512, the dynamic user interface framework 315 splits the web page into an n×n grid (anchor layout) where 'n' is dependent on a height and width of the web page. During operation 514, the dynamic user interface framework 315 creates a dictionary of elements (content items) located within cells of the n×n grid (anchor layout).

In some embodiments, as the web page is opened and 'n' is defined, the camera is instantiated to track a face of the user and the world (e.g., environment within which the user is located), during operation 516. The n×n grid (anchor layout) is created on an augmented reality scene with 'n' number of cells within the n×n grid. Dimensions of each cell are calculated by the dynamic user interface framework 315. 'n' anchors are created and instantiated with one anchor per cell in the n×n grid. A live feed of frames from the camera is passed to the biometrics processing framework 320. During operation 518, an augmented reality scene and world map are created, which relate to an environment within which the user is located and/or viewing the web page. During operation 520, the n×n grid (anchor layout) having an anchor per cell is created and overlaid the web page.

During operation 524, the biometrics processing framework 320 determines whether eyes of the user are within a field of view of the camera. If the eyes are in the field of view of the camera, then the biometrics processing framework 320 determines whether a head of the user is within the field of view of the camera, during operation 526. If the head of the user is in the field of view of the camera, then the biometrics processing framework 320 performs eye gesture recognition. As part of eye gesture recognition, the biometrics processing framework 320 extracts left and right eye landmarks, during operation 528. Additionally, pupils and iris landmarks are extracted as part of eye gesture recognition, during operation 530.

View point calibration is performed using the landmarks extracted during the eye gesture recognition. As part of view point calibration, a common view point is calculated with a midpoint algorithm, during operation 532. During operation 534, a depth of view point is calculated from the screen in the direction of the head (z). During operation 536, 3D view point coordinates (x, y, z) are derived and shared by the biometrics processing framework 320 with the augmented reality anchor framework 304.

With view point calibration, the biometrics processing framework 320 evaluates incoming frames from the camera in order to identify the head, pupil, iris, and other eye landmarks of the user. In some embodiments, MediaPipe and Tensorflow frameworks may be used by the biometrics processing framework 320 to identify this information. If the eyes of the user and head direction are in the field of view of the camera, then the view point is computed such as through a midpoint algorithm that processes the iris landmarks. A distance between a direction of the head and the view point on the screen is computed, and the viewpoint that was calibrated on the screen (x, y, z) (e.g., 3D view point coordinates (x, y, z)) is provided to the augmented reality anchor framework 304

In some embodiments, a view point detection and calibration algorithm is performed to detect the view point from a human face and eyes (landmarks) within a given frame (imagery) captured by the camera. A frame of a video streaming module is input into the algorithm. The algorithm outputs a position/location of left and right eyes, pupils in the frame, a state of each eye (open or closed), and an annotated frame highlighting the face and eyes. In some embodiments, the algorithm utilizes a trained machine learning model to generate the outputs.

In some embodiments, the algorithm detects the face and initial eye objects as: eye_left=Eye (frame, landmarks, 0) and eye_right=Eye (frame, landmarks, 1). The algorithm locates the pupils in the frame as: (eye_left.pupil.x, eye_left.pupil.y) and (eye_right.pupil.x, eye_right.pupil.y). The coordinates of a left pupil are: x=eye_left.origin[0]+eye_left.pupil.x, y=eye_left.origin[1]+eye_left.pupil.y. The coordinates of a right pupil are: x=eye_right.origin[0]+eye_right.pupil.x, y=eye_right.origin[1]+eye_right.pupil.y. The mean coordinates of the left and right pupil are: x=(self.eye_left.origin[0]+self.eye_left.pupil.x+self.eye_right.origin[0]+self.eye_right.pupil.x)/2; and y=(self.eye_left.origin[1]+self.eye_left.pupil.y+self.eye_right.origin[1]+self.eye_right.pupil.y)/2.

The algorithm calculates the horizontal ratio of given coordinates as a number between 0.0 and 1.0, which indicates the direction of the gaze with respect to the content on the screen—0.0 is extreme left, 0.5 being the center and 1.0 being extreme right. This is calculated as: pupil_left=self.eye_left.pupil.x/(self.eye_left.center[0]*2−10); pupil_right=self.eye_right.pupil.x/(self.eye_right.center[0]*2−10); and Horizontal_ratio=(pupil_left+pupil_right)/2.

The algorithm calculates the vertical ratio of the given coordinates as a number between 0.0 and 1.0, which indicates the direction of the gaze with respect to the content on the screen—0.0 is extreme top, 0.5 being the center and 1.0 being extreme bottom. This is calculated as: pupil_left=self.eye_left.pupil.y/(self.eye_left.center[1]*2−

10); pupil_right=self.eye_right.pupil.y/(self.eye_right.center[1]*2−10); and Vertical_ratio=(pupil_left+pupil_right)/2.

The midpoint of the pupil_left and pupil_right is calculated as: x,y=((pupil_leftX+pupil_rightX)/2), ((pupil_leftY+pupil_rightY)/2).

The head direction and deviation from center position is calculated and translated to a midpoint, which results in a view point of xv, yv=x+hfx, y+hfy, where hf: head directional factor. In this way, the view point coordinates (e.g., 3D view point coordinates) are provided to the augmented reality anchor framework 304.

During operation 537, the augmented reality anchor framework 304 translates the view point coordinates (x, y, z screen viewpoint coordinates) according to a coordinate system of an augmented related scene (x, y) where an anchor is to be plotted and defined. In this way, the view point coordinates (x, y, z) are translated into augmented reality scene view points (x, y). The augmented reality anchor framework 304 performs augmented reality anchor management for a scene (x, y). During operation 538, the augmented reality anchor framework 304 activates an anchor at the (x, y) coordinates in the given augmented reality scene. That is, a cell within the anchor layout where the (x, y) coordinates lie is identified. An anchor in that cell is activated. The cell contains the content item of interest for the user (e.g., image or text of the web page that the user is looking at). During operation 540, the scene (x, y), the anchor (e.g., a unique identifier with a position of the anchor), and an augmented reality world map (a unique identifier) is saved such as to an internal augmented reality data storage system.

During operation 542, the element of interest (e.g., a content item in the cell) and associated elements (e.g., other content items in the same cell) are tracked. As part of structuring the element of interest and associated elements, a directory with the element of interest that is at the (x, y) coordinates is created. The other elements in the cell form an associated elements array, and are added to the dictionary. The data of the element of interest and associated elements is transmitted to an on-device machine learning based personalization framework.

The on-device machine learning based personalization framework implements machine learning APIs whose input from the dynamic user interface framework 315 are the element of interest and the associated elements. The element of interest and the associated elements are analyzed by text extraction and a natural language understanding engine of the on-device machine learning based personalization framework in order to understand the context and intent of the user. The machine learning APIs recognize a product or object based upon text or images of the elements, which is also used to identify the intent of the user. Once the intent is identified, dynamic prediction and recommendation engines are used to recommend an improved personalized experience for this user. Personalized content, recommended by the dynamic prediction and recommendation engines, is visually presented to the user in the form of an anchor positioned on the coordinates of the document object model element of interest (e.g., the content item of the web page) such that the user sees the personalized content and does not see the content item that would be otherwise visible to other users. The anchor is enabled for touch and other user interactions.

User interaction with the anchor (e.g., an anchor label) and the grid (e.g., anchor layout) is tracked in order to obtain additional insight into the user's purpose of visiting the web page (e.g., the user is looking to purchase a wooden desk). Actions such as object selection, panning, and other touch interactions are combined with gaze tracking of the user on the screen and emotions observed from the face of the user from the frames, which are stored within a database. The information within the database is used to understand the intent of the user and provide the user with a more personalized experience while visiting the web page or other web pages. Also, user interactions can be evolved into a heat map, which can be collectively utilized from multiple users in order to obtain a more detailed understanding of insights when looking at a user base for demographics-based analysis in cloud machine learning systems (e.g., an understanding of what content is of interest or disinterest to the users when accessing a website).

According to some embodiments, a method may be provided. The method includes evaluating a user interface displayed by a device to generate an anchor layout of cells that are populated with anchors; augmenting the user interface with the anchor layout so that the cells overlay content items of the user interface; tracking, using imagery captured from a camera, sets of view point coordinates of a user viewing the user interface; translating the sets of view point coordinates into sets of augmented reality scene view points; utilizing the sets of augmented reality scene view points to determine that the user is viewing a cell within which an anchor is populated, wherein the cell is overlaying a content item determined to be of interest to the user; evaluating features of the content item to generate personalized content for the user; and displaying the personalized content through the anchor to visually overlay the content item.

According to some embodiments, the method includes overlaying the anchor layout over the user interface, wherein the anchor layout, cells, and anchors are transparent and not visible to the user.

According to some embodiments, the method includes displaying the personalized content according to a location and size that visually occludes the content item.

According to some embodiments, the method includes overlaying the anchor layout over the user interface and displaying the personalized content while retaining content of the user interface in an unmodified state.

According to some embodiments, the method includes generating the personalized content as alternate text that is different than text of the content item.

According to some embodiments, the method includes generating the personalized content as an image that is different than an existing image of the content item.

According to some embodiments, the method includes enabling the anchor for user interaction; and in response to the user interacting with the personalized content, triggering execution of functionality based upon the anchor being enabled for the user interaction.

According to some embodiments, the user interface is a web page, and the personalized content comprises at least one of text, an image, a video, a product compare interface, a help interface, a purchase interface, or a troubleshooting interface selected or generated utilizing a machine learning framework.

According to some embodiments, a non-transitory computer-readable medium storing instructions that when executed facilitate performance of operations, is provided. The operations include evaluating a user interface displayed by a device to generate an anchor layout of cells that are populated with anchors; augmenting the user interface with the anchor layout so that the cells overlay content items of the user interface; tracking, using imagery captured from a camera, sets of view point coordinates of a user viewing the user interface; translating the sets of view point coordinates into sets of augmented reality scene view points; utilizing the sets of augmented reality scene view points to determine that the user is viewing a cell within which an anchor is populated, wherein the cell is overlaying a content item determined to be of interest to the user; evaluating features of the content item to generate personalized content for the user; and displaying the personalized content through the anchor to visually overlay the content item.

According to some embodiments, the operations include utilizing a machine learning framework to identify and evaluate the features of the content item in order to determine a user interest of the user in a product or object; and generating the personalized content based upon the user interest in the product or object.

According to some embodiments, the operations include utilizing a machine learning framework to identify and evaluate the features of the content item in order to determine a user interest of the user in a variant of a product or object associated with the content item; and generating the personalized content based upon the variant of the product or object.

According to some embodiments, the operations include defining a number of anchor invocations for the anchors as being directly proportional to a screen resolution of a display of the device.

According to some embodiments, the anchor intercepts biometric gaze detections using the imagery from the camera, and wherein the biometric gaze detections are used to determine the sets of view point coordinates.

According to some embodiments, the operations include calculating a number of cells for the anchor layout based upon a height and width of the user interface.

According to some embodiments, the anchor interconnects a product asset of the content item with a workflow that is executed as part of the personalized content.

According to some embodiments, different personalized content is provided to a different user viewing the user interface based upon the different user having a different interest than the user.

According to some embodiments, a system is provided. The system comprises a display, memory storing instructions, and a processor that executes the instructions to perform operations comprising evaluating a user interface presented by the display to generate an anchor layout of cells that are populated with anchors; augmenting the user interface with the anchor layout so that the cells overlay content items of the user interface; tracking, based upon user input through the system, sets of coordinates of a user interacting the user interface; translating the sets of coordinates into sets of augmented reality scene view points; utilizing the sets of augmented reality scene view points to determine that the user is viewing a cell within which an anchor is populated, wherein the cell is overlaying a content item determined to be of interest to the user; evaluating features of the content item to generate personalized content for the user; and displaying the personalized content through the anchor to visually overlay the content item.

According to some embodiments, the operations include extracting text and context information from the content item; utilizing the text and context information to detect a product depicted or described by the content item; determining a sentiment associated with viewing the content item; and generating the personalized content based upon the sentiment and the product.

According to some embodiments, the operations include utilizing a demographic based recommendation engine, sentiment analyzer, and context analyzer to generate a prediction; and generating the personalized content based upon the prediction.

According to some embodiments, the operations include in response to detecting that the user has transitioned to viewing a different cell populated with a different anchor, displaying different personalized content through the different anchor.

Figure 6:
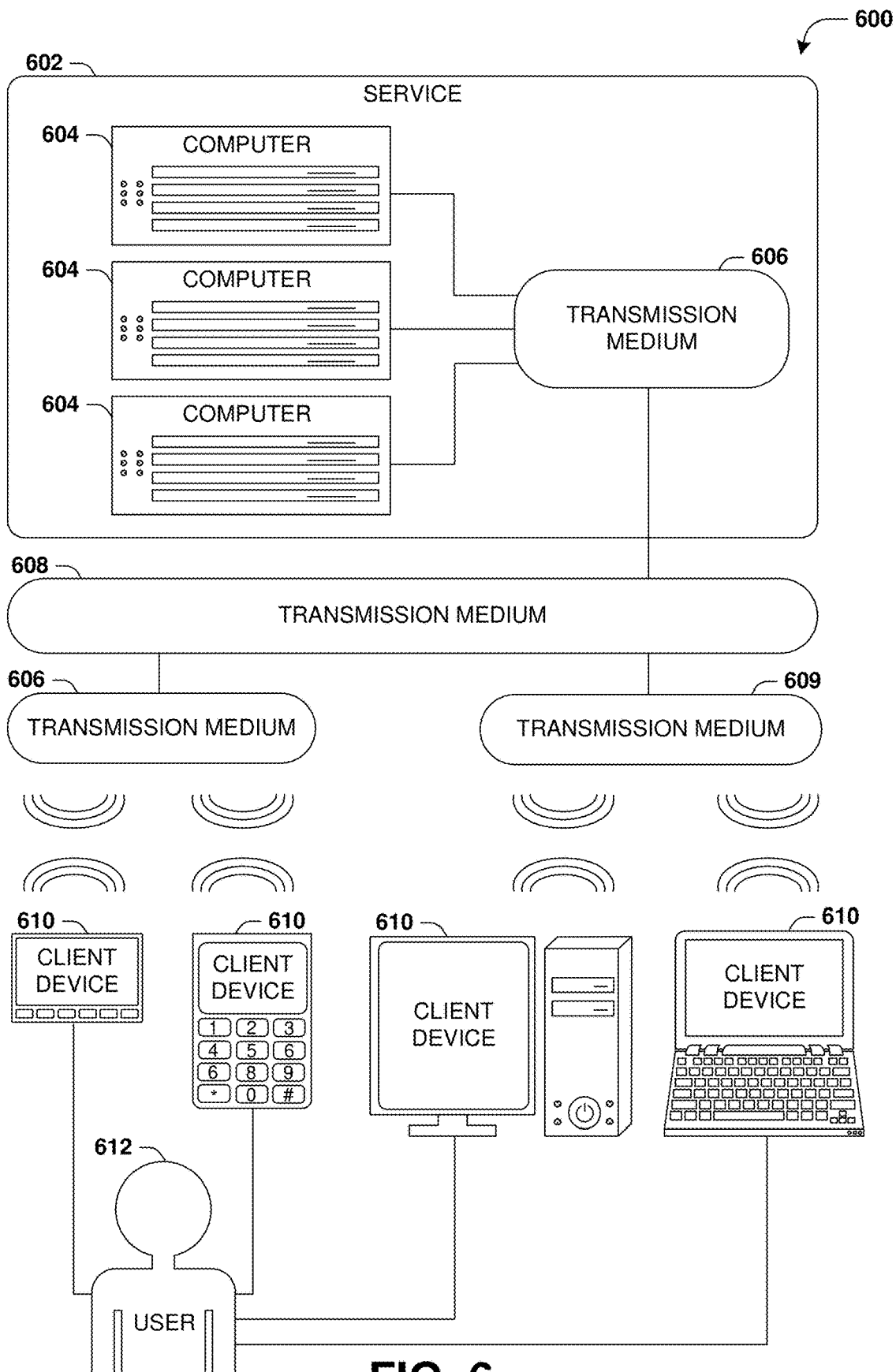
FIG. 6 is an illustration of example networks that may utilize and/or implement at least a portion of the techniques presented herein.

FIG. 6 is an interaction diagram of a scenario 600 illustrating a service 602 provided by a set of computers 604 to a set of client devices 610 via various types of transmission mediums. The computers 604 and/or client devices 610 may be capable of transmitting, receiving, processing, and/or storing many types of signals, such as in memory as physical memory states.

In some embodiments, the computers 604 may be host devices and/or the client device 610 may be devices attempting to communicate with the computer 604 over buses for which device authentication for bus communication is implemented.

The computers 604 of the service 602 may be communicatively coupled together, such as for exchange of communications using a transmission medium 606. The transmission medium 606 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 602.

Likewise, the transmission medium 606 may comprise one or more sub-networks, such as may employ different architectures, may be compliant or compatible with differing protocols and/or may interoperate within the transmission medium 606. Additionally, various types of transmission medium 606 may be interconnected (e.g., a router may provide a link between otherwise separate and independent transmission medium 606).

In scenario 600 of FIG. 6, the transmission medium 606 of the service 602 is connected to a transmission medium 608 that allows the service 602 to exchange data with other services 602 and/or client devices 610. The transmission medium 608 may encompass various combinations of devices with varying levels of distribution and exposure, such as a public wide-area network and/or a private network (e.g., a virtual private network (VPN) of a distributed enterprise).

In the scenario 600 of FIG. 6, the service 602 may be accessed via the transmission medium 608 by a user 612 of one or more client devices 610, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 610 may communicate with the service 602 via various communicative couplings to the transmission medium 608. As a first such example, one or more client devices 610 may comprise a cellular communicator and may communicate with the service 602 by connecting to the transmission medium 608 via a transmission medium 609 provided by a cellular provider. As a second such example, one or more client devices 610 may communicate with the service 602 by connecting to the transmission medium 608 via a transmission medium 609 provided by a location such as the user's home or workplace (e.g., a WiFi (Institute of Electrical and Electronics Engineers (IEEE) Standard 602.11) network or a Bluetooth (IEEE Standard 602.15.1) personal area network). In this manner, the computers 604 and the client devices 610 may communicate over various types of transmission mediums.

Figure 7:
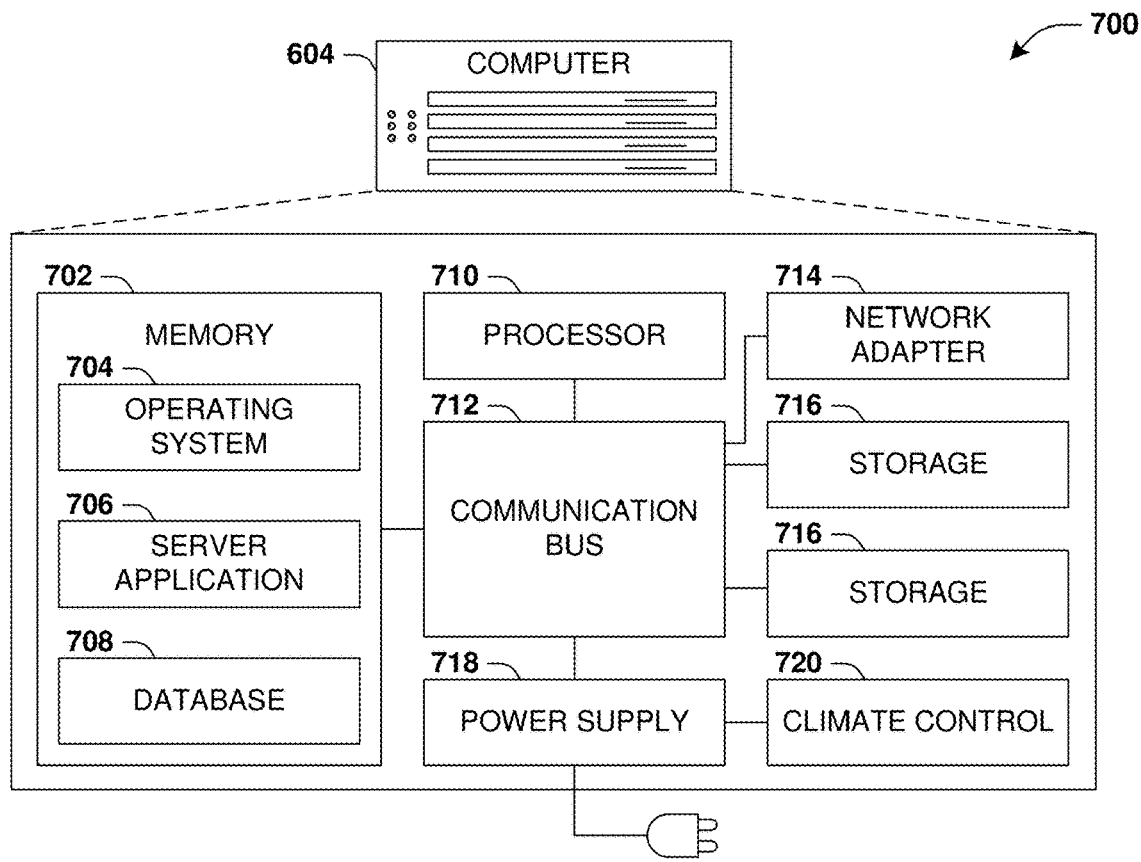
FIG. 7 is an illustration of a scenario involving an example configuration of a computer that may utilize and/or implement at least a portion of the techniques presented herein.

FIG. 7 presents a schematic architecture diagram 700 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The computer 604 may comprise memory 702 storing various forms of applications, such as an operating system 704; one or more computer applications 706; and/or various forms of data, such as a database 708 or a file system. The computer 604 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader.

The computer 604 may comprise a mainboard featuring one or more communication buses 712 that interconnect the processor 710, the memory 702, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the computer 604 with at least one other computer. Other components that may optionally be included with the computer 604 (though not shown in the schematic architecture diagram 700 of FIG. 7) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 718 that supplies and/or regulates power for the other components. The computer 604 may provide power to and/or receive power from another computer and/or other devices. The computer 604 may comprise a shared and/or dedicated climate control unit 720 that regulates climate properties, such as temperature, humidity, and/or airflow. Many such computers 604 may be configured and/or adapted to utilize at least a portion of the techniques presented herein.

Figure 8:
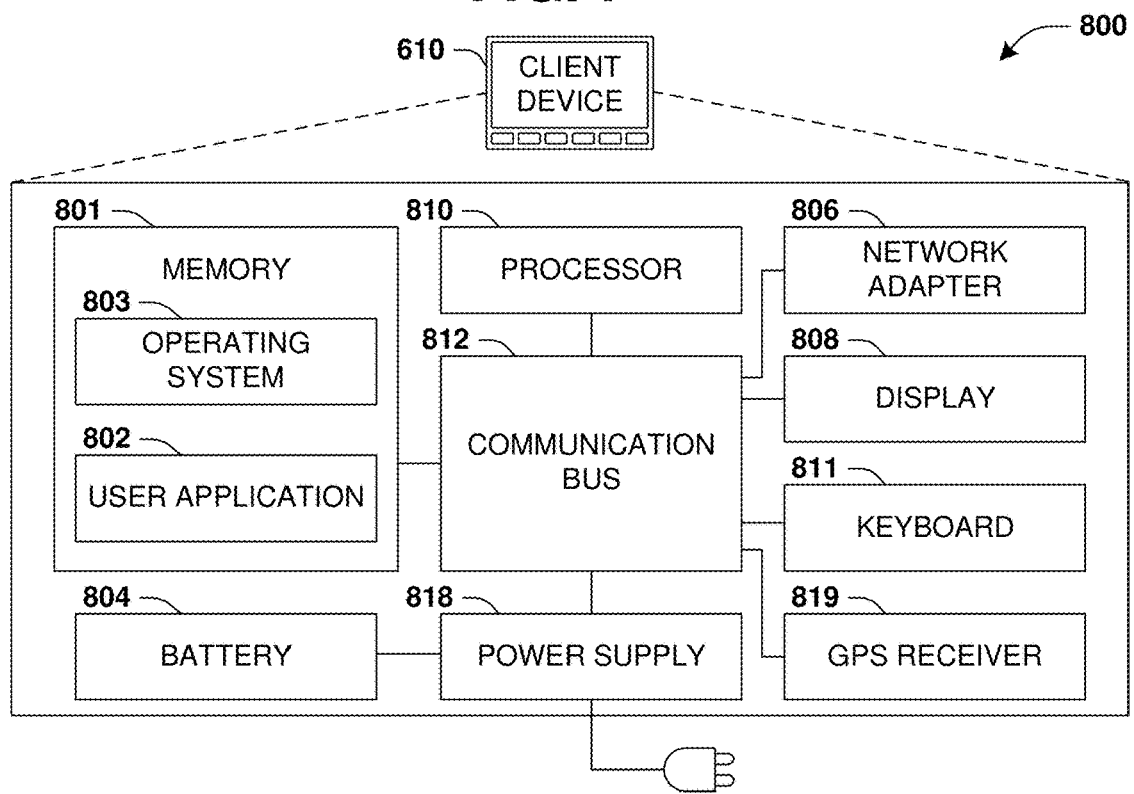
FIG. 8 is an illustration of a scenario involving an example configuration of a client that may utilize and/or implement at least a portion of the techniques presented herein.

FIG. 8 presents a schematic architecture diagram 800 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 808; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The client device 610 may comprise memory 801 storing various forms of applications, such as an operating system 803; one or more user applications 802, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a global positioning system (GPS) receiver 819 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 800 of FIG. 8) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 812 that interconnect the processor 810, the memory 801, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 818 that supplies and/or regulates power for other components, and/or a battery 804 that stores power for use while the client device 610 is not connected to a power source via the power supply 818. The client device 610 may provide power to and/or receive power from other client devices.

Figure 9:
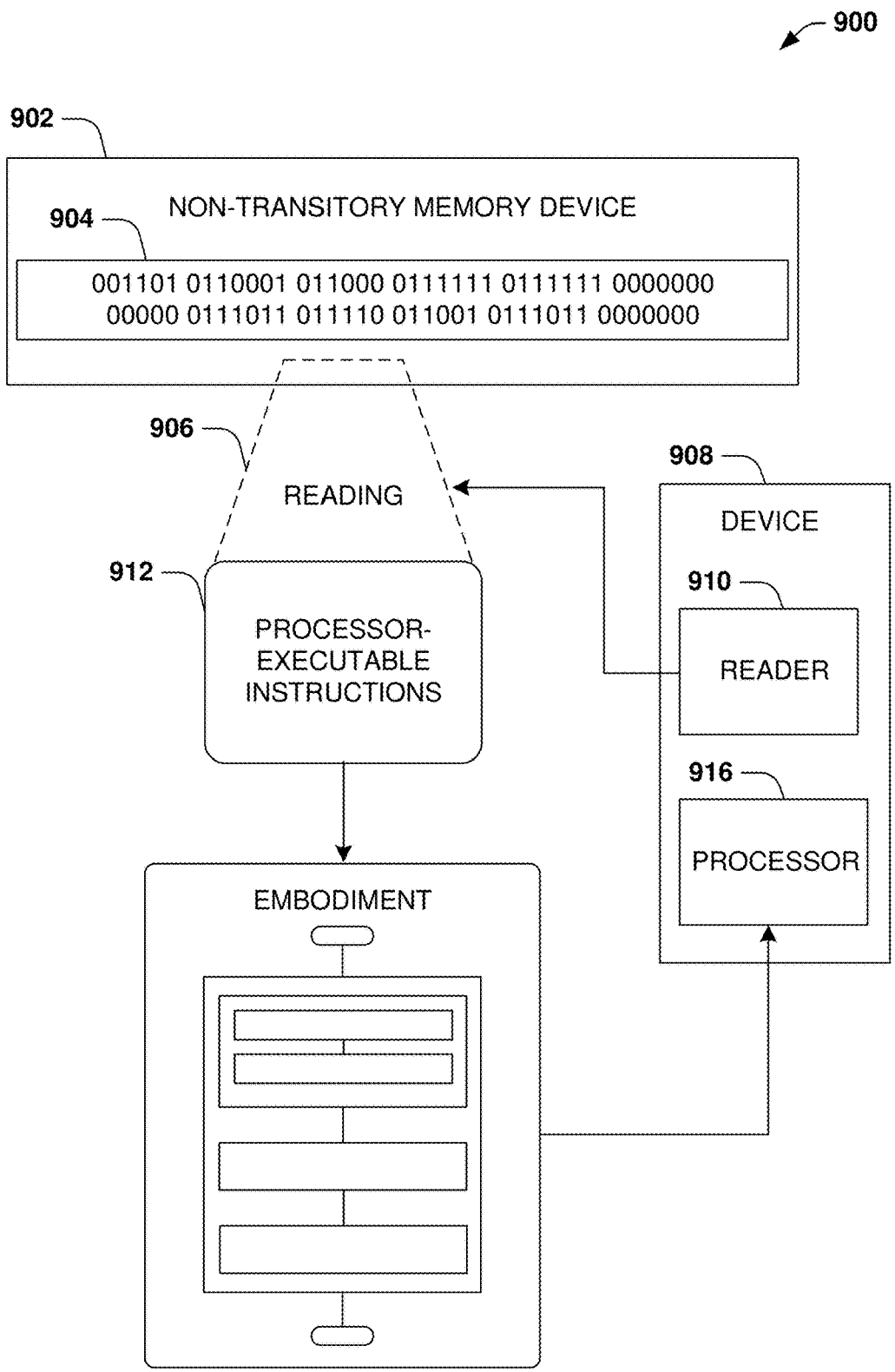
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 200 of FIG. 2, for example. In some embodiments, the processor-executable instructions 912 are configured to cause implementation of a system, such as at least some of the example system 100 of FIGS. 1A-1D, at least some of the example system 300 of FIG. 3, at least some of the example system 400 of FIG. 4, and/or at least some of the example system 500 of FIG. 5.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:
   evaluating a user interface displayed by a device to generate a grid of cells that are populated with anchors;

augmenting the user interface displayed by the device with the grid of the cells so that the cells overlay content items of the user interface displayed by the device;

tracking, using imagery of a user of the device captured from a camera, sets of view point coordinates of the user viewing the user interface displayed by the device;

translating the sets of view point coordinates into sets of augmented reality scene view points;

utilizing the sets of augmented reality scene view points to determine that the user is viewing a cell, on the user interface displayed by the device, within which an anchor is populated, wherein the cell is overlaying a content item determined to be of interest to the user;

evaluating features of the content item to generate personalized content for the user; and displaying the personalized content through the anchor to visually overlay the content item.

2. The method of claim 1, wherein augmenting the user interface displayed by the device comprises:

overlaying the grid of the cells over the user interface displayed by the device, wherein the grid of the cells, and anchors are transparent and not visible to the user.

3. The method of claim 1, wherein displaying the personalized content comprises:

displaying the personalized content according to a location and size that visually occludes the content item.

4. The method of claim 1, comprising:

overlaying the grid of the cells over the user interface displayed by the device and displaying the personalized content while retaining content of the user interface displayed by the device in an unmodified state.

5. The method of claim 1, comprising:

generating the personalized content as alternate text that is different than text of the content item.

6. The method of claim 1, comprising:

generating the personalized content as an image that is different than an existing image of the content item.

7. The method of claim 1, comprising:

enabling the anchor for user interaction; and in response to the user interacting with the personalized content, triggering execution of functionality based upon the anchor being enabled for the user interaction.

8. The method of claim 1, wherein the user interface displayed by the device is a web page, and wherein the personalized content comprises at least one of text, an image, a video, a product compare interface, a help interface, a purchase interface, or a troubleshooting interface selected or generated utilizing a machine learning framework.

9. A non-transitory computer-readable medium storing instructions that when executed facilitate performance of operations comprising:

evaluating a user interface displayed by a device to generate an anchor layout of cells that are populated with anchors;

augmenting the user interface displayed by the device with the anchor layout so that the cells overlay content items of the user interface displayed by the device;

tracking, using imagery of a user of the device captured from a camera, sets of view point coordinates of the user viewing the user interface displayed by the device;

translating the sets of view point coordinates into sets of augmented reality scene view points;

utilizing the sets of augmented reality scene view points to determine that the user is viewing a cell, on the user interface displayed by the device, within which an anchor is populated, wherein the cell is overlaying a content item determined to be of interest to the user;

evaluating features of the content item to generate personalized content for the user; and displaying the personalized content through the anchor to visually overlay the content item.

10. The non-transitory computer-readable medium of claim 9, wherein the operations comprise:

utilizing a machine learning framework to identify and evaluate the features of the content item in order to determine a user interest of the user in a product or object; and generating the personalized content based upon the user interest in the product or object.

11. The non-transitory computer-readable medium of claim 9, wherein the operations comprise:

utilizing a machine learning framework to identify and evaluate the features of the content item in order to determine a user interest of the user in a variant of a product or object associated with the content item; and generating the personalized content based upon the variant of the product or object.

12. The non-transitory computer-readable medium of claim 9, wherein the operations comprise:

defining a number of anchor invocations for the anchors as being directly proportional to a screen resolution of a display of the device.

13. The non-transitory computer-readable medium of claim 9, wherein the anchor intercepts biometric gaze detections using the imagery from the camera, and wherein the biometric gaze detections are used to determine the sets of view point coordinates.

14. The non-transitory computer-readable medium of claim 9, wherein the operations comprise:

calculating a number of cells for the anchor layout based upon a height and width of the user interface displayed by the device.

15. The non-transitory computer-readable medium of claim 9, wherein the anchor interconnects a product asset of the content item with a workflow that is executed as part of the personalized content.

16. The non-transitory computer-readable medium of claim 9, wherein different personalized content is provided to a different user viewing the user interface displayed by the device based upon the different user having a different interest than the user.

17. A system, comprising:

a display;

a memory storing instructions; and a processor that executes the instructions to perform operations comprising:

evaluating a user interface presented by the display to generate an anchor layout of cells that are populated with anchors;

augmenting the user interface presented by the display with the anchor layout so that the cells overlay content items of the user interface presented by the display;

tracking, based upon user input through the system, sets of coordinates of a user interacting the user interface presented by the display;

translating the sets of coordinates into sets of augmented reality scene view points;

utilizing the sets of augmented reality scene view points to determine that the user is viewing a cell, on the user interface presented by the display, within which an anchor is populated, wherein the cell is overlaying a content item determined to be of interest to the user;

evaluating features of the content item to generate personalized content for the user; and displaying the personalized content through the anchor to visually overlay the content item.

18. The system of claim 17, wherein evaluating the features comprises:

extracting text and context information from the content item;

utilizing the text and context information to detect a product depicted or described by the content item;

determining a sentiment associated with viewing the content item; and generating the personalized content based upon the sentiment and the product.

19. The system of claim 17, wherein evaluating the features comprises:

utilizing a demographic based recommendation engine, sentiment analyzer, and context analyzer to generate a prediction; and generating the personalized content based upon the prediction.

20. The system of claim 18, wherein the operations comprise:

in response to detecting that the user has transitioned to viewing a different cell populated with a different anchor, displaying different personalized content through the different anchor.

* * * * *